United States Patent
Benakli et al.

(10) Patent No.: US 7,573,683 B1
(45) Date of Patent: Aug. 11, 2009

(54) WRITE HEADS WITH FLOATING SIDE SHIELDS AND MANUFACTURING METHODS

(75) Inventors: Mourad Benakli, Shrewbuy, MA (US); Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 386 days.

(21) Appl. No.: 11/483,408

(22) Filed: Jul. 6, 2006

Related U.S. Application Data

(60) Provisional application No. 60/697,582, filed on Jul. 8, 2005, provisional application No. 60/709,578, filed on Aug. 19, 2005.

(51) Int. Cl.
*G11B 5/127* (2006.01)

(52) U.S. Cl. .................................. 360/319

(58) Field of Classification Search ........... 360/125.72, 360/123.58, 123.37, 319
See application file for complete search history.

(56) References Cited

U.S. PATENT DOCUMENTS

| | | | |
|---|---|---|---|
| 4,935,832 A | 6/1990 | Das et al. | |
| 6,954,340 B2 * | 10/2005 | Shukh et al. | 360/317 |
| 7,031,110 B2 * | 4/2006 | Yamanaka | 360/125.68 |
| 7,233,457 B2 * | 6/2007 | Johnston et al. | 360/125.04 |
| 7,295,401 B2 * | 11/2007 | Jayasekara et al. | 360/125.08 |
| 2003/0048579 A1 * | 3/2003 | Kikuchi et al. | 360/123 |

* cited by examiner

*Primary Examiner*—Angel A. Castro
(74) *Attorney, Agent, or Firm*—Campbell Nelson Whipps, LLC

(57) ABSTRACT

A write head for a media drive suited for perpendicularly recording data in adjacent magnetic recording media, the media having a magnetic recording layer and a soft underlayer (SUL). The write head has a pole tip, a write yoke connected to the pole tip, a write return yoke, a write shield, one or more conductive coils surrounding the write yoke, and one or more side shields disposed in close proximity to the pole tip. The write return yoke connects to the write yoke on one end and the write shield on a different end. The one or more side shields are separated from the pole tip and write shields by a non-magnetic material and therefore are "floating" and not directly coupled to the write shield or pole tip.

24 Claims, 10 Drawing Sheets

(a) Frontal View (b) Bottom (ABS) View

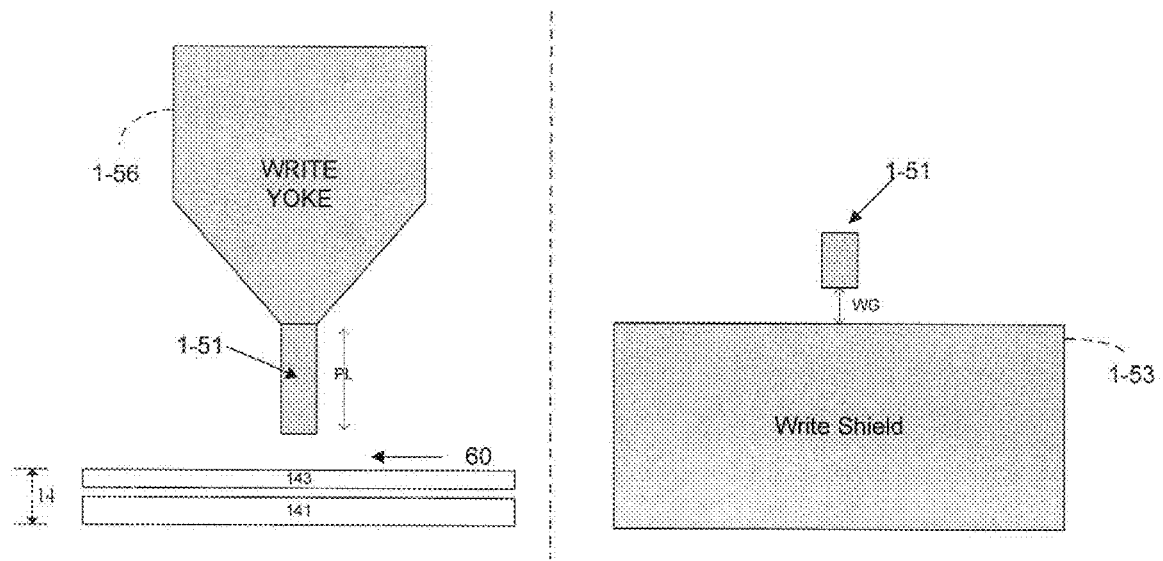
(a) Frontal View   Figure 3.   (b) Bottom (ABS) View
Prior Art
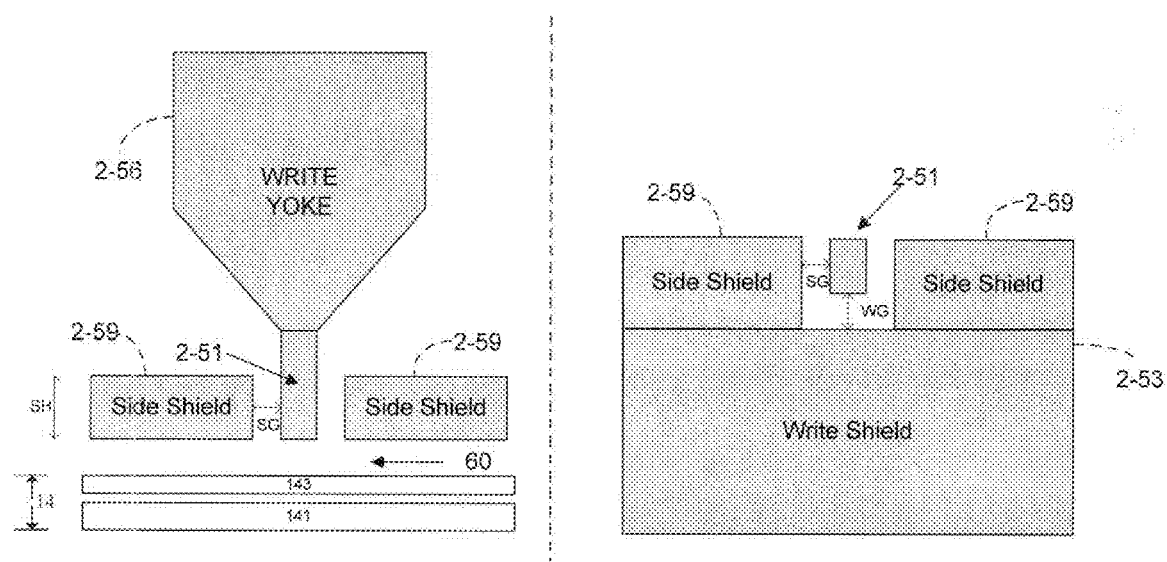
(a) Frontal View   Figure 4.   (b) Bottom (ABS) View

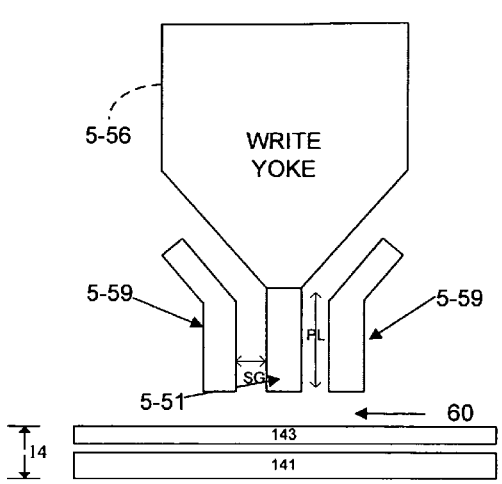
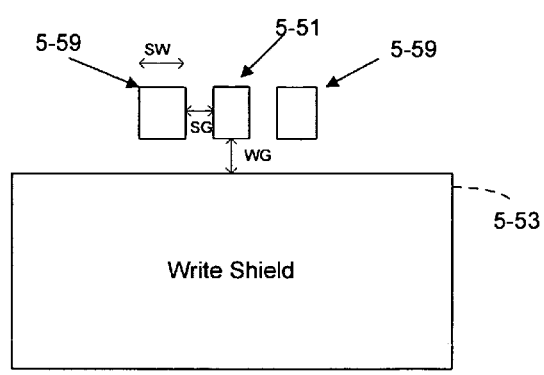
(a) Frontal View     Figure 7.     (b) Bottom (ABS) View

WRITE HEADS WITH FLOATING SIDE SHIELDS AND MANUFACTURING METHODS

CROSS-REFERENCE TO RELATED PATENT APPLICATIONS

This application is an application claiming the benefit under 35 USC 119(e) from U.S. Provisional Application Ser. No. 60/697,582, filed Jul. 8, 2005, entitled "Floating Side Shields for Write Heads", the contents of which are incorporated by reference herein. This application is also an application claiming the benefit under 35 USC 119(e) from U.S. Provisional Application Ser. No. 60/709,578, filed Aug. 19, 2005, entitled "Floating Side Shields for Write Heads", the contents of which are incorporated by reference herein.

BACKGROUND

1. Field of the Invention

The present invention relates generally to media write heads having at least one floating side shield and, in particular embodiments, to disk drive write heads with floating side shields that reduce fringe field effects on neighboring tracks during the performance of a write operation, and methods to manufacture such write heads.

2. Related Art

Disk drives are used in a variety of electronic devices, ranging from personal computers to portable media players, for the storage and retrieval of data. In a disk drive, data is typically written to and read from magnetic storage media called disks. A disk drive typically comprises a plurality of disks for the storage of data and one or more read/write heads for the reading and writing of data. There is a constant market demand to increase the data storage density of disks. Increasing the storage density of the disks can decrease the price to storage-capacity ratio of the disk drives, increase performance, and decrease the physical dimensions of the disk drive.

The write head typically comprises a pole tip, a yoke supporting the write pole tip, and conductive coils around the yoke for electrically magnetizing the write pole tip. During a write operation where the disk drive changes the storage state of a bit of data on the disk, the write head is moved to the location of the bit of data such that the pole tip is positioned directly above the bit, an electric current is passed through the coils to magnetize the pole tip, which in turn causes the magnetization of the bit to change.

In recent years, perpendicular recording has been introduced to achieve greater data storage density for disk drives. In perpendicular recording, the magnetization of each bit is aligned vertically, perpendicular to the disk surface. Compared to longitudinal recording, a perpendicular recording system allows more data bits per unit of disk surface area, which in turn enables greater data storage density for the disk drives.

On the surface of a disk, the data bits are arranged in concentric circles called tracks. As the area needed for each bit decreases, the track width also decreases, thus increasing the number of tracks per inch and the storage density of the disk. However, as the tracks become more closely spaced, a problem arises when the fringe magnetic field emitted by the write pole tip during a write operation affects the magnetic storage state of bits on a neighboring track. The fringe field can cause inadvertent erasures on neighboring tracks, or enhance thermal decay of adjacent tracks. These effects could cause data loss, a decrease in data storage reliability, or catastrophic failures to the disk drive.

In light of the problem discussed above, it is therefore preferable to have a write head design that reduces the fringe fields emitted by the write pole tip. One method of producing such a write head is proposed by U.S. Pat. No. 4,935,832, which discloses side shields connected to a downstream pole of the write head for the reduction of fringe fields emitted from the write pole tip.

The side shield design disclosed in U.S. Pat. No. 4,935,832 is difficult to manufacture due to the difficulty in controlling the gap distance between the side shields and the write pole tip, in addition to the need to define the gap distance between the write pole tip and the write shield (return shield). Since the write pole tip and the write shield (to which the side shields are attached to) are manufactured in separate steps, it is impractical to accurately define the gap distances between the write pole tip, write shield, and side shields using the current manufacturing techniques.

In addition, the structure disclosed in U.S. Pat. No. 4,935,832 has another disadvantage of creating magnetic flux leakage from the write pole tip. During a write operation, the write pole tip is highly magnetized and thus have a relatively high magnetic potential (V_WP). The magnetic potential of the write shield (return shield) is usually at a very low value creating a return path for the magnetic flux. Since the side shields and the write shield are connected, the side shields have substantially similar magnetic potentials as the very low magnetic potential of the write shield. Hence, there is likely a leakage of magnetic flux from the write pole tip to the side shields. This side-shield leakage is proportional to the difference between the potential of the write pole tip (V_WP) and the potential of the side shields (V_SS). During a write operation, this potential difference between V_WP and V_SS can be large, causing a large amount of magnetic flux leakage from the write pole tip to the side shields. This flux leakage decreases the overall efficiency of the write head because more current is needed to induce sufficient magnetic field to achieve the write operation. The side-shield leakage is also inversely proportional to the gap distance between the side shield and the write pole tip. Thus, increasing the gap distance between the side shield and the write pole tip can reduce side-shield leakage. However, if this gap distance is larger than the track-to-track pitch of the disk, the side shield will cease to protect adjacent tracks from fringe field effects. Therefore, using a design in which the side shields are connected to and magnetically coupled with the write shield, magnetic flux leakage from the write pole tip to the side shields is likely unavoidable.

Therefore, embodiments of the present invention relate to creating a write pole tip with side shields which reduces fringe field effects on adjacent tracks but also reduces side-shield leakage, utilizing a manufacturing process easily controllable with the current manufacturing techniques.

SUMMARY OF THE DISCLOSURE

Embodiments of the present invention relate generally to disk drive write heads with one or more floating side shields that shield adjacent tracks of the disk from fringe field effects, and methods to manufacture such write heads.

A write head according to a general embodiment of the present invention is suited for perpendicularly recording data in adjacent magnetic recording media, said media comprising a magnetic recording layer and a soft underlayer (SUL). The write head comprises a pole tip, a write yoke connected to the pole tip, a write return yoke, a write shield, one or more conductive coils surrounding the write yoke, and one or more side shields disposed in close proximity to the pole tip. The write return yoke connects to the write yoke on one end and the write shield on a different end. The one or more side shields are separated from the pole tip and write shields by a non-magnetic material. Hence, in this general embodiment, the side shields are "floating" and not directly magnetically coupled with the write shield or pole tip.

In various embodiments, the one or more side shields comprises two side shields disposed in parallel to the write shield, and on opposite sides of the pole tip. In some embodiments, the two side shields are separated from the pole tip by an equal gap distance.

In various embodiments, the one or more side shields are encased in non-magnetic material.

In various embodiments, the magnetic potential of each of the one or more side shields is higher than the magnetic potential of the write shield during a write operation.

In various embodiments, the one or more side shields are dimensioned and spaced such that each of the one or more side shields has a magnetic potential higher than a magnetic potential of the write shield but an induced field in the media from each of the one or more side shields is lower than the nucleation field of the magnetic recording layer during a write operation.

In various embodiments, the height of each side shield is longer than the neck length of the pole tip. The height of the side shield is measured along the edge of the side shield substantially parallel to and in closest proximity to the pole tip.

In various embodiments, the gap distance between the pole tip and side shields is between 10% to 40% of a track pitch of the magnetic recording layer, and the gap distance is also larger than 50% of the pole tip to soft underlayer (SUL) distance during a write operation. The track pitch is measured by the distance from the middle of one track to the middle of its immediate neighboring track.

In various embodiments, the side shields are dimensioned and spaced such that the magnetic flux leakage from the pole tip to the side shields account for less than 20% of the total magnetic flux flowing through the pole tip, during a write operation.

In various embodiments, each side shield is connected to the write shield by a magnetic connector, wherein the cross-sectional width of each magnetic connector is less than the width of the side shield. The width of the side shield is measured by the edge of the side shield substantially parallel to and closest to the write shield.

In various alternate embodiments, instead of a non-magnetic material separating each of the one or more side shields from the write shield, the material separating each side shield from the write shield may be magnetic with low saturation magnetization or low permeability. In such embodiments, a potential of each side shield may still be higher than a potential of the write shield. Also, in some alternate embodiments, the material separating each of the one or more side shields from the write shield may be magnetic with low saturation magnetization or low permeability such that a drop of magnetic potential from the write shield to each side shield is at least 25% of a potential difference from the write shield to the SUL of the magnetic recording media.

Moreover, in various alternate embodiments, instead of a non-magnetic material separating each of the one or more side shields from the pole tip, the material separating each side shield from the pole tip may be magnetic with low saturation magnetization or low permeability. In some alternate embodiments, a material separating each side shield from the pole tip may be magnetic with low saturation magnetization or low permeability and a particular material separating each side shield from the write shield may be magnetic with low saturation magnetization or low permeability. For various such alternate embodiments, low saturation magnetization and low permeability limits for a suitable magnetic material to separate the one or more side shields from the pole tip may be different than low saturation magnetization and low permeability limits for a suitable particular magnetic material to separate the one or more side shields from the write shield.

A disk drive device according to an embodiment of the present invention comprises one or more recording medium and one or more magnetic head supported for perpendicular recording on the one or more recording medium. Each recording medium comprising a soft underlayer (SUL) supporting a magnetic recording layer. Each magnetic head comprises a pole tip, a write yoke connected to the pole tip, a write return yoke, a write shield, one or more electrically conductive coils surrounding the write yoke, and one or more side shields disposed in close proximity to the pole tip. The write return yoke connects to the write yoke on one end and the write shield on a different end. Each side shield is separated from the pole tip and write shield by a non-magnetic material. In various alternate embodiments, instead of a non-magnetic material separating each side shield from the write shield, the material separating each side shield from the write shield may be magnetic with low saturation magnetization or low permeability.

A method for manufacturing a magnetic head for a disk drive according to an embodiment of the present invention comprises the steps of depositing a first non-magnetic spacer layer, depositing a plating seed layer, plating at least one side shield and a pole tip layer on the first non-magnetic spacer layer, depositing a layer of a first non-magnetic material using ion-beam assisted deposition, and planarizing using a chemical-mechanical polishing step. The side shields and the pole tip layer are defined by a common mask, and are separated by a trench.

In various embodiments, the ion-beam assisted deposition is a normal incident ion-beam assisted deposition, and the trench between the side shields and the pole tip is completely filled by said deposition.

In various other embodiments, the ion-beam assisted deposition is an angled-incident ion-beam assisted deposition, and the method of manufacturing the magnetic head further comprises the step of filling trench between the side shields and the pole tip using an electro-plating process. In one embodiment, the angled-incident ion-beam assisted deposition is processed using a +/−20 degree angle. In another embodiment, the method of manufacturing the magnetic head further comprises a step of a normal-incident ion milling to expose the plating seed layer on the bottom of the trench between the at least one side shield and the pole tip, said step of the ion milling occurring subsequent to the step of the angled-incident ion-beam assisted deposition and before the step of electro-plating.

In various other embodiments, the method of manufacturing the magnetic head further comprises the steps of depositing a write yoke layer on the pole tip layer, said write yoke layer covering the pole tip layer except in a pole tip region; depositing a second non-magnetic spacer layer uniformly over the pole tip layer and write yoke layer; depositing a non-magnetic ramp on the second non-magnetic spacer layer encasing conductive coils; and, depositing a magnetic layer on the nonmagnetic ramp and second non-magnetic spacer layer to form a write shield and write return yoke.

BRIEF DESCRIPTION OF THE DRAWINGS

FIG. 3 illustrates the pole tip region of a typical write head, FIG. 3(a) illustrates a frontal view, and FIG. 3(b) illustrates a bottom (ABS) view;

FIG. 4 illustrates the pole tip region of a write head with side shields connected to the write shield, FIG. 4(a) illustrates a frontal view, and FIG. 4(b) illustrates a bottom (ABS) view;

FIG. 5(a) illustrates a frontal view, and FIG. 5(b) illustrates a bottom (ABS) view;

FIG. 6(a) illustrates a frontal view, and FIG. 6(b) illustrates a bottom (ABS) view;

FIG. 7 illustrates the pole tip region of a write head according to yet another embodiment of the present invention, FIG. 7(a) illustrates a frontal view, and FIG. 7(b) illustrates a bottom (ABS) view;

DETAILED DESCRIPTION

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Embodiments of the present invention relates to write head designs which utilizes a floating side shield to reduce or eliminate magnetic fringe fields emitted by the pole tip. Such a write head is used in the read/write head of a disk drive 10.

Figure 1:
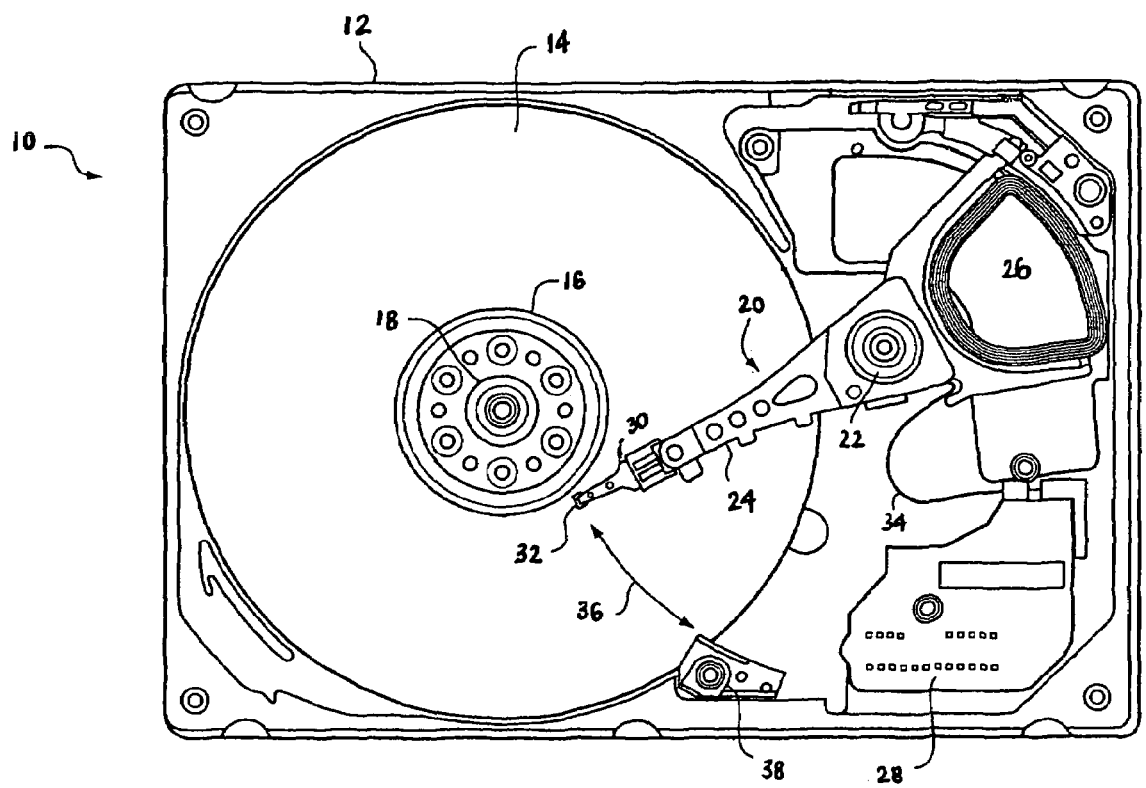
FIG. 1 illustrates a simplified top view of a disk drive.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
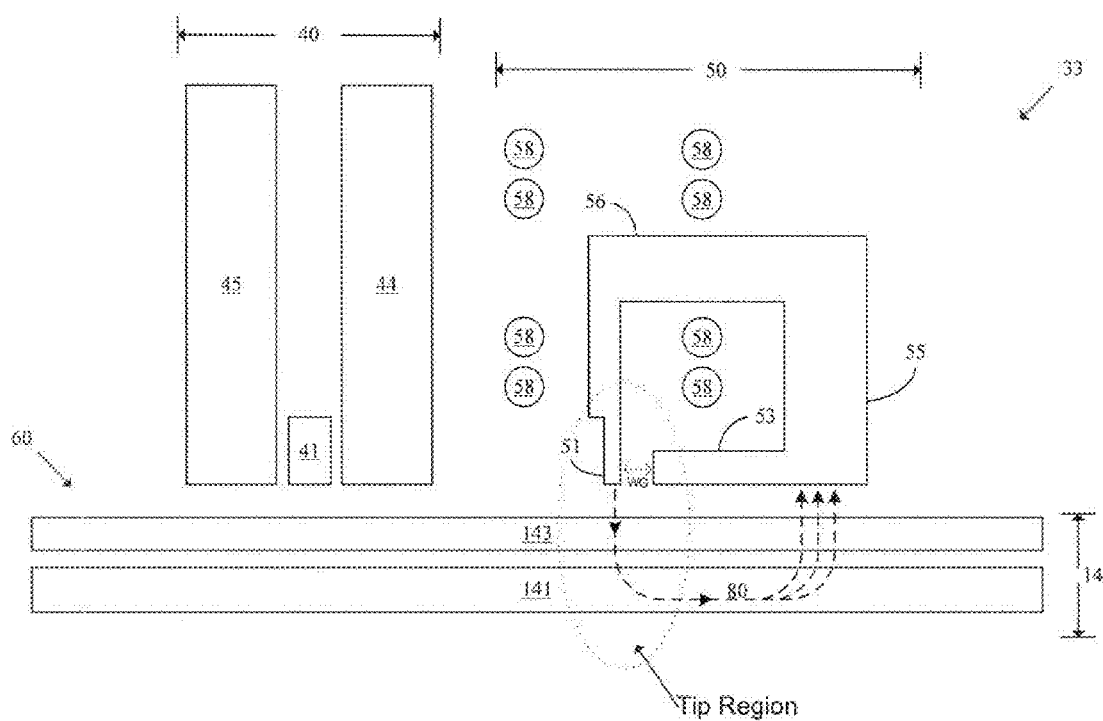
FIG. 2 illustrates a typical read/write head.

FIG. 2 illustrates a head 33 that is mounted on the slider 32. The head 33 comprises a read head 40 and a write head 50. The read head 40 comprises a read sensor 41, and read shields 44 and 45. The write head 50 comprises a pole tip 51 connected to a write yoke 56, a write return yoke 55 connected to the write yoke 56 on one end, and the write return yoke 55 connected to a write shield (return shield) on a second end. Furthermore, the write head 50 comprises conductive coils 58 surrounding the write yoke 56 for the generation of a magnetic field. When an electric current is passed through the conductive coils 58, the current induces a magnetic field in the write yoke 56, which causes the pole tip 51 to become magnetized. FIG. 2 illustrates the state of the head 33 while the disk drive 10 is in operation. During a write or a read operation, the head 33 is positioned in close proximity to the disk 14, separated by an air-bearing-surface (ABS) 60. The disk 14 comprises a soft underlayer (SUL) 141 supporting a magnetic storage layer 143.

During a write operation of the disk drive, the slider 32 moves to a position where the head 33 is positioned directly above the region of the disk 14 corresponding to a bit of data, where the write head 50 and the disk 14 is separated by an air-bearing-surface (ABS) 60. A current flows through the conductive coils 58 of the write head 50 generating a magnetic field in the write yoke 56. The magnetization in the write yoke 56 causes the pole tip 51 to become magnetized. The SUL 141 is typically composed of a magnetically soft material with higher magnetic permeability compared to the material of the magnetic storage layer 143. As a result of the higher permeability of the SUL 141, the magnetic flux 80 from the pole tip 51 passes vertically through the magnetic storage layer 143 to the SUL 141. The magnetic flux 80 then passes through the SUL 141 and returns to the write return yoke 55 (return path). Because the tip area of the pole tip 51 is small, the magnetic flux 80 density is high in the region of the magnetic storage layer 143 positioned immediately under the pole tip 51; hence, the magnetic flux 80 is capable of causing a change of the storage state of a bit of data. By comparison, because the return path is wider in surface area, the magnetic flux density on the return path is lower since it is distributed over a wide area. Therefore, the storage state of the magnetic storage layer 143 on the return path remains unchanged.

As the pole tip 51 emits the magnetic flux 80 during a write operation, the pole tip 51 also emits magnetic flux onto neighboring tracks (fringe field), which could potentially cause inadvertent erasure on the neighboring tracks, or enhance thermal decay of adjacent tracks.

FIGS. 3-7 illustrates details of the tip region within the dashed oval area labeled "Tip Region" of FIG. 2. Each of FIGS. 3(a)-7(a) illustrates a frontal view of the tip region, as viewed from the left edge of FIG. 2 towards the right edge. Each of FIGS. 3(b)-7(b) illustrates a bottom view, as viewed from the perspective of the ABS 60, or as viewed from the bottom edge of FIG. 2 towards the top edge.

FIG. 3 illustrates the structures of the tip region in a design without side shields. FIG. 3(a) is a frontal view of the pole tip 1-51. The pole tip 1-51 connects to the write yoke 1-56, but is smaller in dimension. The write yoke 1-56 narrows down in a trapezoidal-shaped neck region to connect to the write pole tip 1-51. The height of the pole tip 1-51 is called the pole tip neck length (PL). The pole tip 1-51 is separated from the disk 14 by an air-bearing-surface (ABS) 60. The disk 14 comprises a magnetic storage layer 143 supported by a SUL 141, as previously discussed in reference to FIG. 2. FIG. 3(b) illustrates a bottom view (ABS view). The pole tip 1-51 is closed spaced from the write shield (return shield) 1-53, separated by a write pole tip gap (WP).

FIG. 4 illustrates the region around the pole tip in a design with side shields 2-59 connected to the write shield 2-53. FIG. 4(a) is a frontal view of the pole tip 2-51. On both the left and right sides of the pole tip 2-51, two side shields 2-59 are disposed in close proximity to the pole tip 2-51, each separated by a side shield to pole tip gap (SG) distance. FIG. 4(b) illustrates the bottom (ABS) view of FIG. 4(a). As shown in FIG. 4(b), the side shields 2-59 extends from and are connected to the write shield 2-53.

In a manufacturing process, the pole tip 2-51 and write shield 2-53 are manufactured in two separate steps. Since the side shields 2-59 and write shield 2-53 are connected as one structure, they must be manufactured together. Therefore, the manufacturing of the structure shown in FIG. 4 is extremely difficult because the SG dimension (side shield to pole tip gap) is difficult to control when the side shields 2-59 and pole tip 2-51 are manufactured in separate process steps.

Furthermore, as shown in FIG. 4(*b*), the side shields 2-59 and write shield 2-53 are connected together throughout the width of the side shields 2-59, hence they are coupled together magnetically and have substantially the same magnetic potential. Because the side shields 2-59 are disposed in close proximity to the pole tip 2-51, and have substantially similar magnetic potential as the write shield 2-53, it is likely that magnetic flux from the pole tip 2-51 would be leaked to the side shields 2-59 in the design shown in FIG. 4. This decreases the efficiency of the write head 50.

Figure 5:
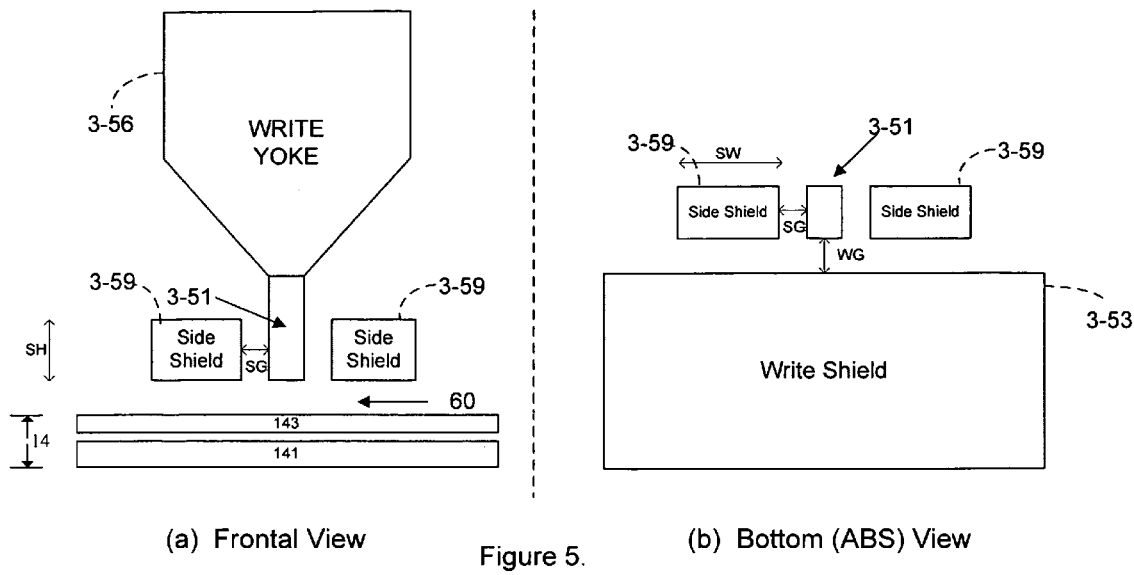
FIG. 5 illustrates the pole tip region of a write head with floating side shields according to one embodiment of the present invention.

FIG. 5 illustrates one embodiment of the invention where the side shields 3-59 are "floating" and not connected to the write shield 3-53. FIG. 5(*a*) illustrates a frontal view and FIG. 5(*b*) illustrates an ABS view. Each side shield 3-59 has a height of SH, and is separated from the pole tip 3-51 by a gap distance of SG. As illustrated in FIG. 5(*b*), each side shields 3-59 also has a width of SW that is less than the overall width of the write shield 3-53. Each side shield 3-59 is also separated from the write shield 3-53 by the same gap distance as the pole tip to write shield gap (WG).

The embodiment illustrated in FIG. 5 has the advantage that since the side shields 3-59 are not connected to the write shield 3-53, the side shields 3-59 can be manufactured in the same process step and defined by the same photolithography mask as the pole tip 3-51. Since the side shields 3-59 and the pole tip 3-51 are defined in the same mask step, the gap distance (SG) between the side shields 3-59 and the pole tip 3-51 can be controlled precisely.

Furthermore, the embodiment illustrated in FIG. 5 has the advantage that the magnetic potential of the side shields 3-59 can be controlled by adjusting the dimensions of the side shields (SH and SW), the gap distances SG and WG. When the write head 50 is performing a write operation, the pole tip 3-51 becomes highly magnetized and hence has a high magnetic potential. The write shield 3-53 has a low magnetic potential (close to 0). As previously discussed, when the side shields 3-59 have a lower magnetic potential than the pole tip 3-51, some amount of magnetic flux will be leaked from the pole tip 3-51 to the side shields 3-53. The amount of magnetic flux leakage is directly proportional to the magnetic potential difference between the pole tip 3-51 and the side shields 3-53. Therefore, it is desirable to have the side shields 3-59 with a magnetic potential at a higher level than that of the write shield 3-53 and relatively close to the potential of the pole tip 3-51 to minimize the amount of magnetic flux leakage while still protecting adjacent tracks from fringe field effects. However, it is desirable that an induced field in the magnetic storage layer 143 due to the magnetic potential of the side shields 3-59 not exceed the nucleation field of the magnetic storage layer 143. Otherwise, the side shields 3-59 would cause undesired erasures on adjacent tracks. Therefore, an optimum magnetic potential for the side shields 3-59 is a magnetic potential higher than that of the write shield 3-53 and that induces a field in the magnetic storage layer 143 close to but lower than the nucleation field of the magnetic storage layer 143.

In the embodiment illustrated in FIG. 5, since the side shields 3-59 are "floating" and not directly coupled to any structure with a predetermined magnetic potential, the magnetic potential of the side shields 3-59 are influenced by the magnetic potentials of nearby structures. The magnetic potential of each side shield 3-59 is proportional to the magnetic potential of a nearby structure, proportional to the surface area of the side shield 3-59 facing that nearby structure, and inversely proportional to the gap distance between the side shield 3-59 and that nearby structure. Therefore, for example, if it is more desirable to have the side shields 3-59 have a magnetic potential closer to the write shield 3-53 (which has a magnetic potential close to 0), the area of the side shields 3-59 facing the write shield 3-53 can be increased by increasing the width of the side shields (SW). On the other hand, if it is more desirable to increase the magnetic potential of the side shields 3-59, the area of the side shields 3-59 facing the pole tip 3-51 can be increased by increasing the side shield height (SH), or decreasing the gap (SG) between the side shields and the pole tip 3-51.

By a method of finite element analysis or SPICE simulation (in which the magnetic impedances of the gaps are simulated as resistances), it is possible to design the dimensions of the side shields 3-59 illustrated in FIG. 5 such that the magnetic potential of the side shields 3-59 is any desired value above 0 and below the magnetic potential of the pole tip 3-51. In some embodiments of the present invention, the desired value can be set at an optimum magnetic potential just below the nucleation field of the magnetic storage layer 143.

Since the magnetic flux leakage from the pole tip 3-51 to the side shields 3-59 is proportional to their magnetic potential difference, it is therefore also possible to adjust the dimensions of the side shields 3-59 and the gap distances (WG and SG) such that the magnetic flux leakage is less than 20%.

In some embodiments, the width of the pole tip 3-51 is approximately 80% of the track pitch (track-to-track distance on the disk 14). The side shield to pole tip gap (SG) is approximately 10-40% of the track pitch to protect fringe field effects on neighboring tracks. The side shield to pole tip gap (SG) should also be larger than 50% of the pole tip 3-51 to SUL 141 distance, to ensure that the magnetic flux emitted from the pole tip 3-51 goes to the SUL 141 rather than the side shields 3-59. Within these dimensional constraints, it is possible to adjust the height (SH) and width (SW) of the side shields 3-59 to achieve the desired magnetic potential for the side shields to be at a level near the optimum level.

Figure 6:
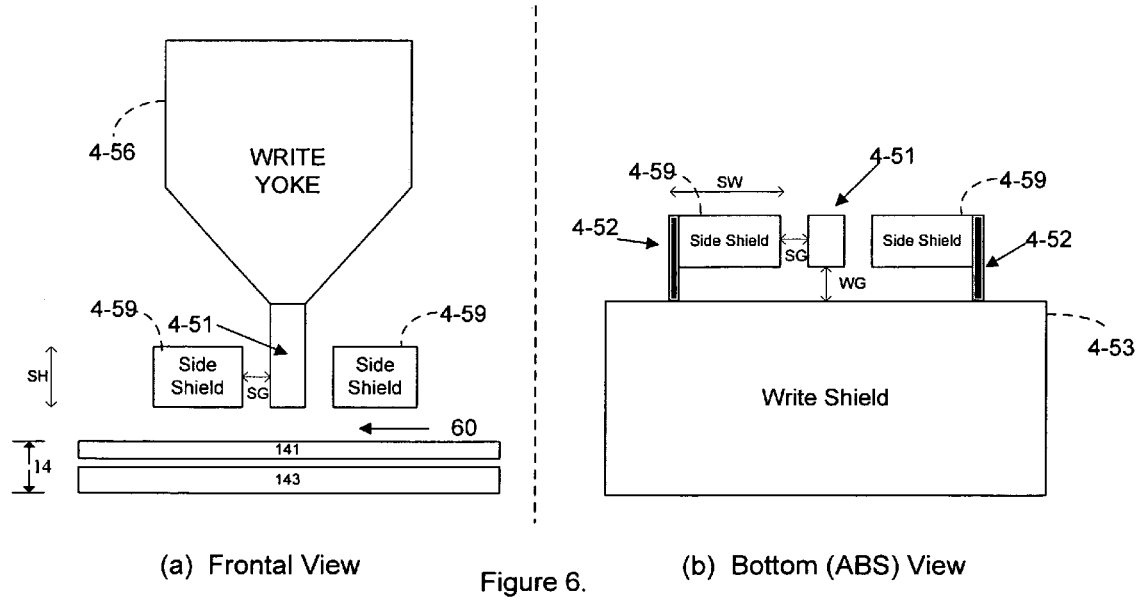
FIG. 6 illustrates the pole tip region of a write head according to another embodiment of the present invention.

FIG. 6 illustrates another embodiment of the present invention comprising a magnetic connector 4-52 connecting each side shield 4-53 to the write shield 4-53. FIG. 6(*a*) illustrates a frontal view and FIG. 6(*b*) illustrates a bottom (ABS) view. The cross-sectional width of each magnetic connector 4-52 is less than the width of the side shield (SW) to which it is connected. In this embodiment, since the magnetic connection area between each side shield 4-53 and the write shield 4-53 is relatively small, the magnetic coupling between the side shields 4-53 and the write shield 4-53 is relatively weak. Since each side shield 4-53 is disposed in close proximity to the pole tip 4-51, the magnetic potential of each side shield will be a value above the magnetic potential of the write shield but below the magnetic potential of the pole tip 4-51. Thus, in this embodiment, the magnetic potential of the side shields 4-59 can be adjusted by adjusting the cross-sectional width of the magnetic connectors 4-52, which determines the amount of magnetic coupling between the side shields 4-52 and the write shield 4-53.

In some embodiments, each magnetic connector 4-52 is composed of a magnetic thin film. In some embodiments, each magnetic connector 4-52 is a magnetic via.

FIG. 7 illustrates yet another embodiment of the present invention. FIG. 7(*a*) illustrates a frontal view and FIG. 7(*b*) illustrates a bottom (ABS) view. In this embodiment, the width (SW) of each side shield 5-59 is made relatively small. However, the height of each side shield 5-59 is made longer than the pole tip neck length (PL). In this embodiment, the magnetic coupling between the side shields 5-59 and the write shield 5-53 is small since only a small amount of surface area of each side shield 5-59 directly faces the write shield 5-53. However, there is a large amount of magnetic coupling between the side shields 5-59 and the pole-tip/yoke structure (elements 5-56 and 5-51) due to the large amount of side shield 3-59 surface area facing it. In this embodiment, the magnetic potential of the side shields can be maintained at a relatively high value.

Figure 8A:
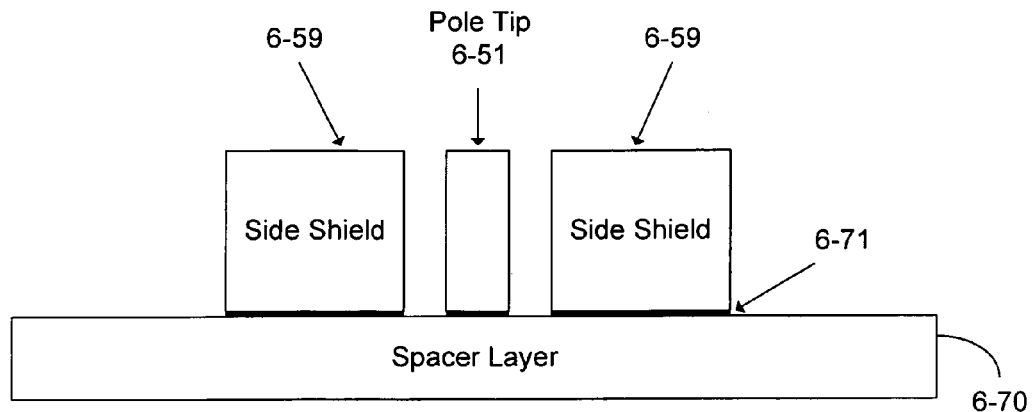
FIGS. 8(a) and 8(b) illustrate the processing steps for one method of depositing non-magnetic material between the side shields and the pole-tip.
Figure 8B:
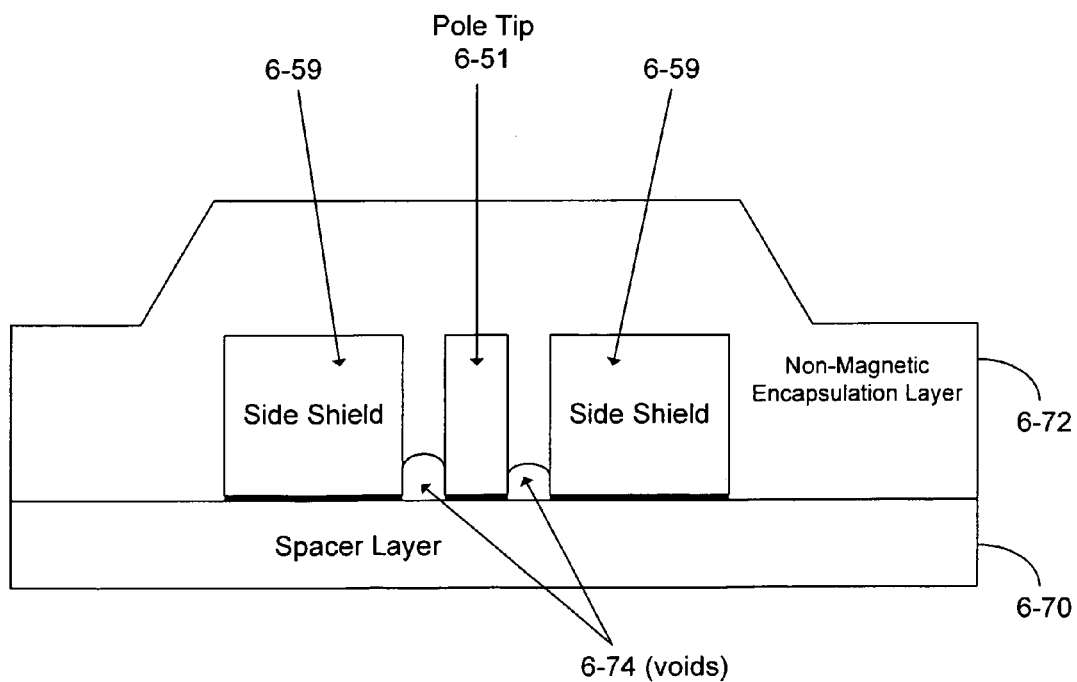
Figure 9A:
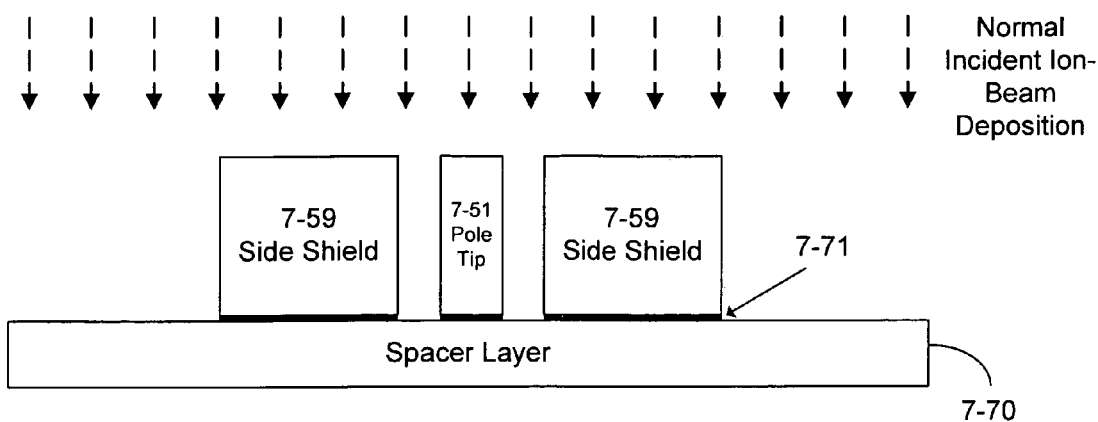
FIGS. 9(a), 9(b), and 9(c) illustrate a method of depositing non-magnetic material between the side shields and the pole-tip according to an embodiment of the present invention.
Figure 9B:
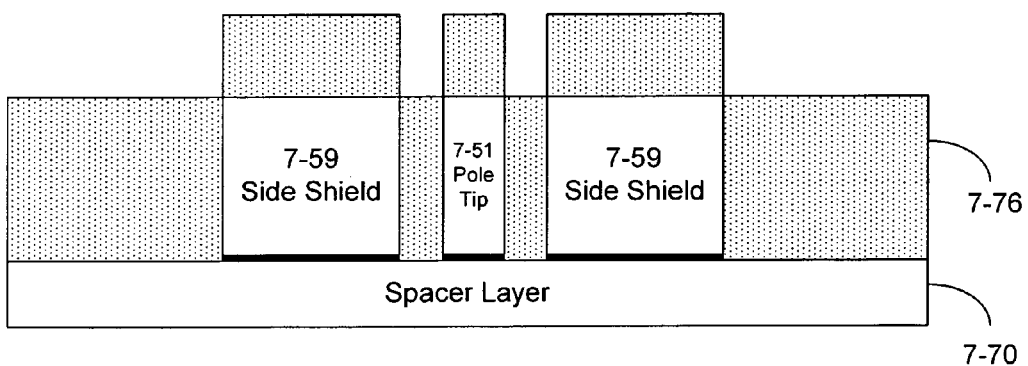
Figure 9C:
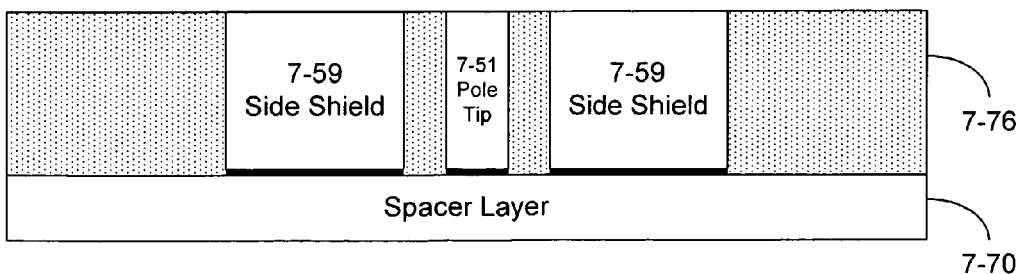
Figure 10A:
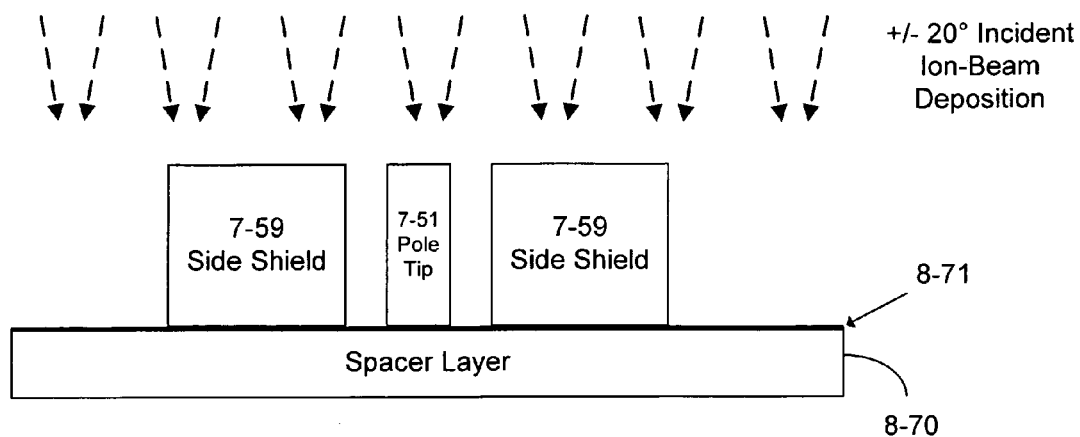
FIGS. 10(a)-(e) illustrate another method of depositing non-magnetic material between the side shields and the pole-tip according to another embodiment of the present invention.
Figure 10B:
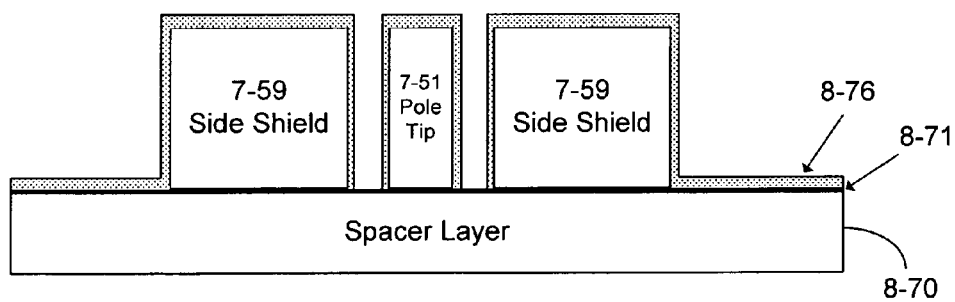
Figure 10C:
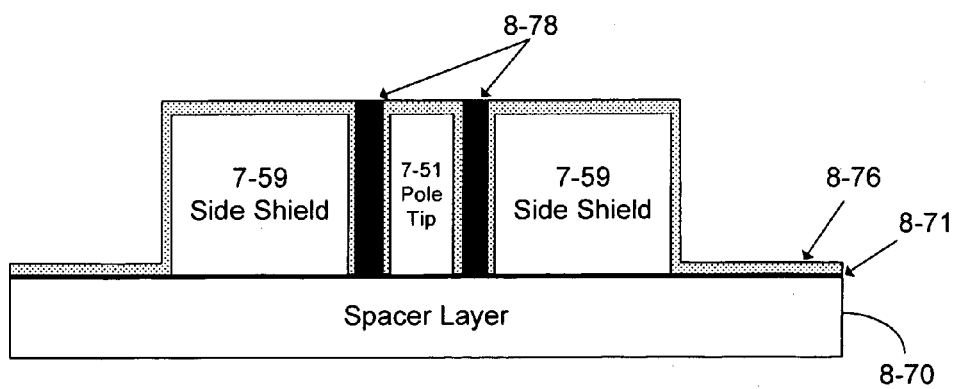
Figure 10D:
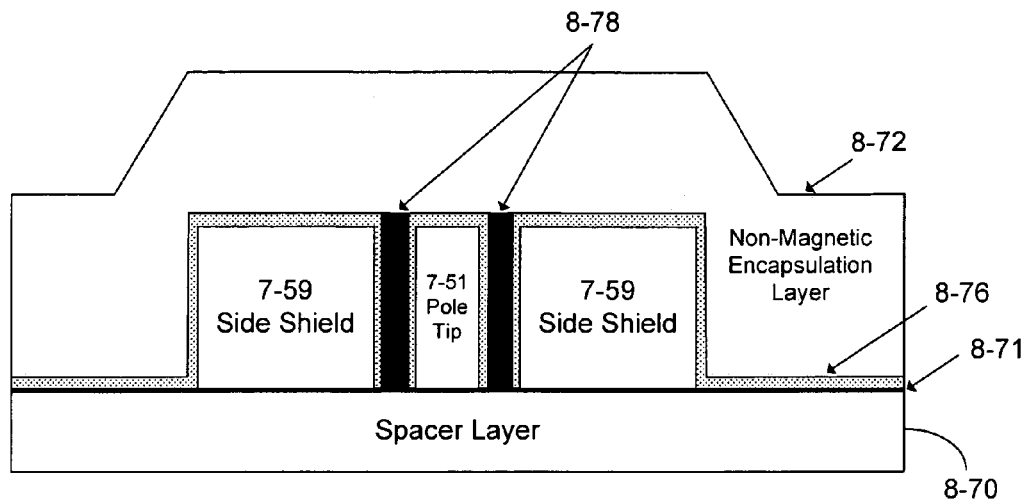
Figure 10E:
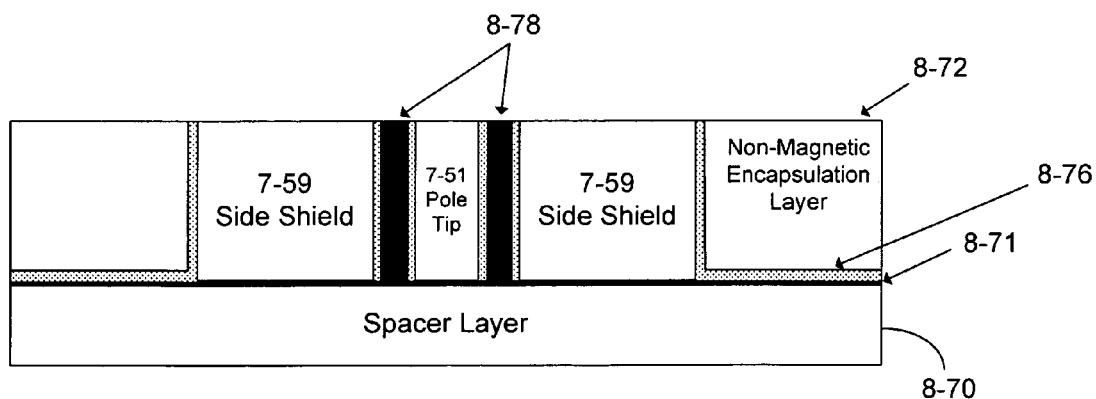
Figure 11:
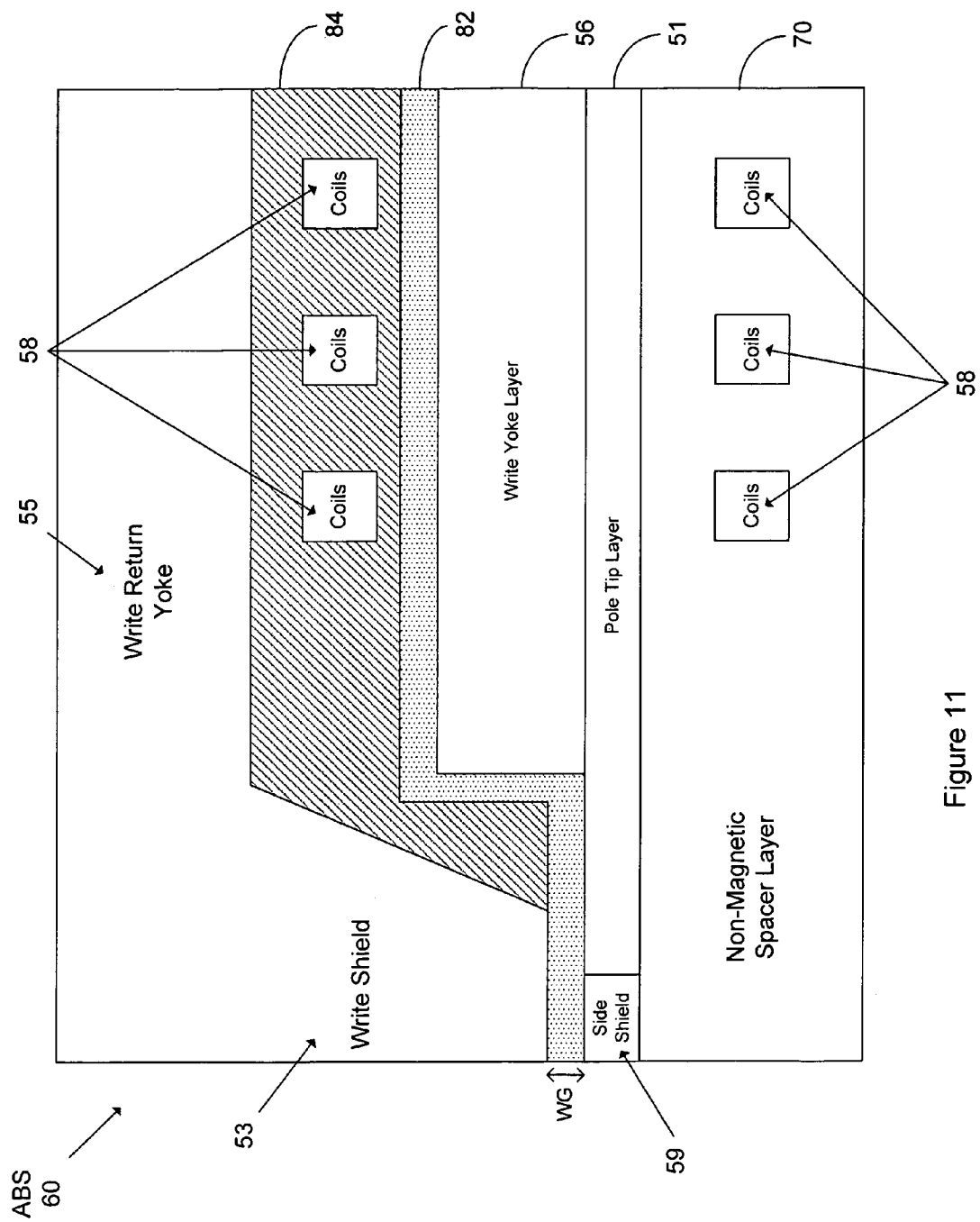
FIG. 11 illustrates a process layers near the pole tip region of a pole tip according to an embodiment of the present invention.

FIGS. 8-11 illustrate methods of manufacturing a write pole tip with floating side shields according to various embodiments of the present invention. FIGS. 8-10 illustrate various manufacturing methods for the structure of the pole tip, while FIG. 11 illustrate the overall structure of the pole tip region.

FIG. 8 illustrates one conventional method of manufacturing the pole tip 6-51 and side shields 6-59. A layer of seeding layer 6-71 is first deposited on a non-magnetic spacer layer 6-70. Various other structures for the head 33 are positioned below the non-magnetic spacer layer 6-70, some of which will be discussed later in reference to FIG. 11. After the deposition of the seeding layer 6-71, the side shields 6-59 and pole tip 6-51 are plated onto the seeding layer 6-71. The region where the side shields 6-59 and pole tip 6-51 are plated is defined by a photolithography mask (not shown). The seeding layer 6-71 outside of the region where the side shields 6-59 and pole tip 6-51 are deposited is then removed. As previously discussed, because the side shields 6-59 and the pole tip 6-51 are defined using the same photolithography mask, this enables precise control of the dimensions of the side shields 6-59 as well as the gap distance between the side shields 6-59 and pole tip 6-51.

In one specific embodiment, the spacer layer 6-70 is composed of $Al_2O_3$, the side shields 6-59 and pole tip 6-59 are composed of NiFe, and the seeding layer 6-71 is a copper layer. However, in other embodiments, various other suitable materials can be used. For example, the seeding layer 6-71 could be composed of a Copper-Tin alloy or a Copper-Zinc alloy.

As shown in FIG. 8(*b*), after the formation of the side shields 6-59 and pole tip 6-51, a non-magnetic encapsulation layer is deposited onto the structure using a sputter deposition process. A sputter deposition process is a relatively fast process where a thick layer can be deposited in a relatively short period of time. However, due to the high aspect ratio (depth/width) of the trench between each side shield 6-59 and the pole tip 6-51, a sputter deposition may not be able to completely fill these trenches. As illustrated in FIG. 8(*b*), voids 6-74 could potentially form on the bottom of the trenches. The likelihood of the formation of the voids 6-74 depends on the sputter deposition process as well as the aspect ratio of the trenches between each side shield 6-59 and pole tip 6-51. However, the formation of voids 6-74 is highly undesirable because it could lead to reliability degradation and failures.

FIG. 9 illustrates a method to manufacture the pole tip structure eliminating the formation of voids according to one embodiment of the present invention. The process steps that are identical to the process discussed while referring to FIG. 8 is omitted here. As shown in FIG. 9(*a*), after the plating of the side shields 7-59 and pole tip 7-51, the structure is subject to a normal incident ion-beam deposition process of a non-magnetic material, such as $Al_2O_3$. Since the incident angle of the ion-beam deposition process is normal (90 degrees) to the substrate, the trenches between each side shield 7-59 and pole tip 7-51 is filled with the non-magnetic material without the risk of void formation.

As illustrated in FIG. 9(*b*), the non-magnetic layer 7-76 is deposited at a normal angle over the entire structure, including on top of the side shields 7-59 and pole tip 7-51. The structure is then subjected to a chemical-mechanical polishing step for planarization, resulting in a structure shown in FIG. 9(*c*).

As compared to the method described in FIG. 8, the current method has the advantage that it eliminates the risk of void-formation on the bottom of the trenches between the side shields 7-59 and pole tip 7-51. However, the ion-beam deposition process is a slower process compared to the sputtering process. It takes a relatively long time to form the thick non-magnetic layer 7-76 using ion-beam deposition as required by this method. Hence, the current method increases processing time and possibly the processing cost compared to the method described in FIG. 8.

FIG. 10 illustrates a method according to another embodiment of the present invention where the formation of voids can be avoided without the need for a lengthy ion-beam deposition process. As shown in FIG. 10(*a*), after the formation of the side shields 7-59 and pole tip 7-51, the seeding layer 8-71 is not removed and remains even in the exposed regions. The structure is then subjected to an angled incident ion-beam assisted deposition of a non-magnetic material, such as $Al_2O_3$, for a short period of time. In this embodiment, the angle is set at +/−20° from the normal angle. However, in other embodiments, other angles which meets the objective of the present invention can also be used.

As shown in FIG. 10(*b*), a thin layer of non-magnetic material 8-76 can be quickly formed over the structure through the angled-incident ion-beam assisted deposition. However, because the ion-beam assisted deposition is at an angle, the bottom of the trenches between the side shields 7-59 and pole tip 7-51 is not covered by the non-magnetic layer 8-76 because the angled ion beams are blocked by nearby structures. Hence, the seeding layer 8-71 on the bottom of the trenches between the side shields 7-59 and pole tip 7-51 remain exposed.

In various embodiments, due to scattering effects of angled ion-beam deposition, a very thin layer of magnetic material 8-76 may also be formed on the bottom of the trenches between the side shields 7-59 and pole tip 7-51. Such a problem can be resolved by subjecting the structure to a light ion-beam milling process, with the ion beam at a normal incident angle to the substrate. Because the layer on the bottom of the trenches is much thinner than in other regions, the seeding layer 8-71 on the bottom of the trenches can be exposed without exposing other regions of the seeding layer 8-71.

As shown in FIG. 10(*c*), the structure is then subject to a electro-plating process of a non-magnetic material. Since only the regions of the seeding layer 8-71 on the bottom of the trenches between the side shields 7-59 and pole tip 7-51 are exposed, only the trenches 8-78 will be filled by the electro-plating process. The material filling the trenches 8-78 must be a non-magnetic material, such as Ni—P alloy (with P>80%), a Copper-Zinc alloy, or a Copper-Tin alloy.

After the trenches 8-78 are filled with a non-magnetic material, the structure is then subject to a sputtering deposition of a non-magnetic layer 8-72, such as $Al_2O_3$. FIG. 10(*d*) illustrates the profile of the structure after the deposition of the non-magnetic layer 8-72. The structure is then subject to a chemical-mechanical polishing step for planarization. FIG. 10(*e*) illustrates the profile of the structure after the chemical-mechanical polishing step.

In this embodiment, there is an advantage that only a short ion-beam assisted deposition is required. Hence, as compared to the method described while referring to FIG. 9, the process time and expense are reduced. However, because the trenches between the side shields 7-59 and pole tip 7-51 are filled using a plating process, the risk of void-formation is also eliminated.

FIG. 11 illustrates the main processing steps of the layers surrounding the tip region according to an embodiment of the present invention. This discussion focuses on the main process steps relevant to the present invention, and certain conventional steps such as the formation of seed layers, certain photolithography layers, chemical-mechanical polishing, layers for electrical connections, and other process steps are omitted. The perspective of FIG. 11 is rotated 90 degrees from the perspective shown in FIGS. 8-10, viewing the structures in FIGS. 8-10 from the right edge of the figure towards the left edge. FIG. 11 only illustrates the region near the pole tip, and other structures that are commonly found in a head 33 is omitted. The structure is formed on a substrate (not shown). Typically, the read head 40 is formed in the space between the non-magnetic spacer layer 70 and the underlying substrate (not shown). The left edge of FIG. 11 illustrates the bottom edge of the write head 50 as shown in FIG. 5. The space beyond the left edge of FIG. 11 is the air-bearing-surface (ABS) 60.

As shown in FIG. 11, a non-magnetic spacer layer 70 is deposited, encasing a set of conductive coils 58. The coils 58 can be a pan-cake type coil (wrapping horizontally with respect to FIG. 11) or a solenoidal-type coil (wrapping vertically with respect to FIG. 11). Next, the pole tip layer 51 and side shields 59 are deposited on the non-magnetic spacer layer 70.

The formation of the pole tip 51 and side shields 59 are accomplished using one of the methods discussed in detail while referring to FIG. 8, 9, or 10. In FIG. 11, the side shield 59 is obscuring the view of the bottom of the pole tip 51. It is noted that both the side shield 59 and pole tip 51 extends to the left edge of FIG. 11. There is another side shield 59 (not shown) behind the pole tip layer 51, obscured by both the first side shield 59 and pole tip layer 51.

Next, a thick write yoke layer 56 is deposited over the entire pole tip layer 51 except the region near the tip. The write yoke layer 56 increases the thickness and magnetic flux conductance of the pole tip layer 51. After the deposition of the write yoke layer 56, another non-magnetic spacer layer 82 composing $Al_2O_3$ is deposited. The thickness of this non-magnetic spacer layer 82 determines the gap distance (WG) between the pole tip 51 and the write shield 53. On top of non-magnetic spacer layer 82, a non-magnetic ramp 84 is deposited, covering the region above the write yoke layer 58 and ramping down towards the pole tip (left edge of the figure). The non-magnetic ramp 84 is composed of hard-baked photoresist, and encases a second set of coils 58. Together, the non-magnetic spacer layer 82 and the non-magnetic ramp 84 separates the pole tip 51 and write yoke 56 from the write shield 53. Next, a thick layer of magnetic material is deposited over the entire structure, forming the write shield 53 and write return yoke 55. It is noted that the write yoke 56 ultimately connects to the write return yoke 55, in the region beyond the right edge of FIG. 11 (not shown). (See FIG. 2).

In various embodiments, each side shield 59 is separated from the write shield 53 by a non-magnetic material. In various alternate embodiments, each side shield 59 is separated from the write shield 53 by a magnetic material having low saturation magnetization or low permeability. Also, in various alternate embodiments, each side shield 59 is separated from the write shield 53 by a magnetic material having low saturation magnetization or low permeability such that, during a write operation, a drop of magnetic potential from the write shield 53 to each side shield 59 is at least 25% of a potential difference from the write shield 53 to a SUL of an adjacent magnetic recording medium.

In various embodiments, each side shield 59 is separated from the pole tip 51 by a non-magnetic material. In various alternate embodiments, each side shield 59 is separated from the pole tip 51 by a magnetic material having low saturation magnetization or low permeability. Also, in various alternate embodiments, each side shield 59 is separated from the pole tip 51 by a magnetic material having low saturation magnetization or low permeability and each side shield 59 is separated from the write shield 53 by a magnetic material having low saturation magnetization or low permeability. For various such alternate embodiments, low saturation magnetization and low permeability limits for a suitable magnetic material to separate each side shield 59 from the pole tip 51 may be different than low saturation magnetization and low permeability limits for a suitable particular magnetic material to separate each side shield 59 from the write shield 53.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A write head for a disk drive, the write head suitable for perpendicularly recording data in an adjacent magnetic recording medium, the magnetic recording medium comprising a magnetic recording layer on a soft underlayer (SUL), the write head comprising:
    a pole tip;
    a write yoke connected to the pole tip;
    a write return yoke, wherein the write yoke connects to a first end of the write return yoke;
    a write shield connected to a second end of the write return yoke different from the first end;
    one or more electrically conductive coils surrounding the write yoke; and
    one or more side shields disposed in close proximity to the pole tip;
    wherein each of the one or more side shields is separated from the pole tip by a non-magnetic material or by a magnetic material with low saturation magnetization or by a magnetic material with low permeability; and
    wherein each of the one or more side shields is separated from the write shield by a particular non-magnetic material or by a particular magnetic material with low saturation magnetization or by a particular magnetic material with low permeability; and
    wherein the one or more side shields are dimensioned and spaced such that each of the one or more side shields has a magnetic potential higher than the magnetic potential of the write shield but an induced field in the magnetic recording layer from each of the one or more side shields is lower than a nucleation field of the magnetic recording layer during a write operation.

2. The write head of claim 1,
    wherein each of the one or more side shields is separated from the pole tip by the non-magnetic material; and
    wherein each of the one or more side shields is separated from the write shield by the particular non-magnetic material.

3. The write head of claim 2, wherein the particular non-magnetic material is a same material as the non-magnetic material.

4. The write head of claim 1, wherein the one or more side shields comprise two side shields disposed in parallel to the write shield on opposite sides of the pole tip.

5. The write head of claim 1, wherein each of the one or more side shields is encased in a specific non-magnetic material.

6. The write head of claim 1,
wherein each of the one or more side shields is separated from the write shield by the particular magnetic material with low saturation magnetization or by the particular magnetic material with low permeability; and
wherein, during a write operation by the write head, a drop of magnetic potential from the write shield to each of the one or more side shields is at least 25% of a potential difference from the write shield to the SUL.

7. The write head of claim 1, wherein a height of each of the one or more side shields in a direction substantially parallel to the pole tip is longer than a neck length of the pole tip.

8. The write head of claim 1, wherein a gap distance between the pole tip and each of the one or more side shields is between 10% to 40% of a track pitch of the magnetic recording layer, and wherein said gap distance is also larger than 50% of a pole tip to soft underlayer (SUL) distance during a write operation.

9. The write head of claim 1, wherein the one or more side shields are dimensioned and spaced such that during a write operation, a magnetic flux leakage from the pole tip to the one or more side shields is less than 20% of a total magnetic flux of the pole tip.

10. The write head of claim 1, further comprising one or more magnetic connectors connecting each of the one or more side shields to the write shield, wherein a total cross-sectional width of the one or more magnetic connectors is less than a total width of the one or more side shields, said width of the one or more side shields measured along a direction substantially parallel to the write shield.

11. The write head of claim 10, wherein a the magnetic potential of the first or more side shields can be adjusted by adjusting a cross-sectional width of each of the one or more magnetic connectors.

12. A disk drive device, comprising:
one or more recording media, each recording medium of the one or more recording media comprising a soft underlayer (SUL) supporting a magnetic recording layer; and
one or more magnetic heads, each of the one or more magnetic heads supported for perpendicular recording on a corresponding recording medium of the one or more recording media;
wherein each magnetic head of the one or more magnetic heads, comprises:
a pole tip;
a write yoke connected to the pole tip;
a write return yoke, wherein the write yoke connects to a first end of the write return yoke;
a write shield connected to a second end of the write return yoke different from the first end;
one or more electrically conductive coils surrounding the write yoke; and
one or more side shields disposed in close proximity to the pole tip;
wherein each of the one or more side shields is separated from the pole tip by a non-magnetic material or by a magnetic material with low saturation magnetization or by a magnetic material with low permeability; and
wherein each of the one or more side shields is separated from the write shield by a particular non-magnetic material or by a particular magnetic material with low saturation magnetization or by a particular magnetic material with low permeability; and
wherein the one or more side shields are dimensioned and spaced such that each of the one or more side shields has a magnetic potential higher than a magnetic potential of the write shield but an induced field in a corresponding recording medium of the one or more recording media from each of the one or more side shields is lower than a nucleation field of the magnetic recording layer of the corresponding recording medium during a write operation.

13. The disk drive device according to claim 12,
wherein each of the one or more side shields is separated from the pole tip by the non-magnetic material in each of the one or more magnetic heads; and
wherein each of the one or more side shields is separated from the write shield by the particular non-magnetic material in each of the one or more magnetic heads.

14. The disk drive device according to claim 13, wherein the particular non-magnetic material is a same material as the non-magnetic material.

15. The disk drive device according to claim 12,
wherein each of the one or more side shields is separated from the write shield by the particular magnetic material with low saturation magnetization or by the particular magnetic material with low permeability in each of the one or more magnetic heads; and
wherein, during a write operation of a particular magnetic head of the one or more magnetic heads, a drop of magnetic potential from the write shield of the particular magnetic head to each of the one or more side shields of the particular magnetic head is at least 25% of a potential difference from the write shield of the particular magnetic head to the SUL of the corresponding recording medium.

16. The disk drive device according to claim 12, wherein the one or more side shields comprise two side shields disposed in parallel to the write shield on opposite sides of the pole tip.

17. The disk drive device according to claim 12, wherein each of the one or more side shields is encased in a specific non-magnetic material.

18. The disk drive device according to claim 12, further comprising one or more magnetic connectors connecting each of the one or more side shields to the write shield, wherein a total cross-sectional width of the one or more magnetic connectors is less than a total width of the one or more side shields, said width of the one or more side shields measured along a direction substantially parallel to the write shield.

19. A write head for a disk drive, the write head suitable for perpendicularly recording data in an adjacent magnetic recording medium, the magnetic recording medium comprising a magnetic recording layer on a soft underlayer (SUL), the write head comprising:
a pole tip;
a write yoke connected to the pole tip;
a write return yoke, wherein the write yoke connects to a first end of the write return yoke;

a write shield connected to a second end of the write return yoke different from the first end;

one or more electrically conductive coils surrounding the write yoke; and one or more side shields disposed in close proximity to the pole tip;

wherein each of the one or more side shields is separated from the pole tip by a non-magnetic material or by a magnetic material with low saturation magnetization or by a magnetic material with low permeability; and wherein each of the one or more side shields is separated from the write shield by a particular non-magnetic material or by a particular magnetic material with low saturation magnetization or by a particular magnetic material with low permeability; and wherein the one or more side shields are dimensioned and spaced such that during a write operation, a magnetic flux leakage from the pole tip to the one or more side shields is less than 20% of a total magnetic flux of the pole tip.

20. The write head of claim 19, wherein a magnetic potential of each of the one or more side shields is higher than the magnetic potential of the write shield during a write operation.

21. The write head of claim 19, wherein each of the one or more side shields is separated from the write shield by the particular magnetic material with low saturation magnetization or by the particular magnetic material with low permeability; and wherein, during a write operation by the write head, a drop of magnetic potential from the write shield to each of the one or more side shields is at least 25% of a potential difference from the write shield to the SUL.

22. The write head of claim 19, wherein the one or more side shields are dimensioned and spaced such that each of the one or more side shields has a magnetic potential higher than the magnetic potential of the write shield but an induced field in the magnetic recording layer from each of the one or more side shields is lower than a nucleation field of the magnetic recording layer during a write operation.

23. The write head of claim 19, wherein a gap distance between the pole tip and each of the one or more side shields is between 10% to 40% of a track pitch of the magnetic recording layer, and wherein said gap distance is also larger than 50% of a pole tip to soft underlayer (SUL) distance during a write operation.

24. The write head of claim 19, wherein each of the one or more side shields is separated from the pole tip by the non-magnetic material; and wherein each of the one or more side shields is separated from the write shield by the particular non-magnetic material.

* * * * *

UNITED STATES PATENT AND TRADEMARK OFFICE
CERTIFICATE OF CORRECTION

PATENT NO. : 7,573,683 B1 Page 1 of 1
APPLICATION NO. : 11/483408
DATED : August 11, 2009
INVENTOR(S) : Benakli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 422 days.

Signed and Sealed this

Fourteenth Day of December, 2010

David J. Kappos
*Director of the United States Patent and Trademark Office*